(12) United States Patent
Valtonen et al.

(10) Patent No.: US 12,112,505 B2
(45) Date of Patent: Oct. 8, 2024

(54) SYSTEM AND METHOD FOR DETERMINING WHETHER A CAMERA COMPONENT IS DAMAGED

(71) Applicant: BLANCCO TECHNOLOGY GROUP IP OY, Joensuu (FI)

(72) Inventors: Markku Valtonen, Joensuu (FI); Lauri Lalli, Joensuu (FI); Juho Pörhönen, Joensuu (FI)

(73) Assignee: BLANCCO TECHNOLOGY GROUP IP OY (FI)

(*) Notice: Subject to any disclaimer, the term of this patent is extended or adjusted under 35 U.S.C. 154(b) by 338 days.

(21) Appl. No.: 17/613,385

(22) PCT Filed: Apr. 22, 2020

(86) PCT No.: PCT/EP2020/061199
§ 371 (c)(1),
(2) Date: Nov. 22, 2021

(87) PCT Pub. No.: WO2020/233930
PCT Pub. Date: Nov. 26, 2020

(65) Prior Publication Data
US 2022/0222855 A1    Jul. 14, 2022

(30) Foreign Application Priority Data

May 22, 2019  (GB) ..................... 1907221

(51) Int. Cl.
*G06T 7/80* (2017.01)
*G06T 7/11* (2017.01)
(Continued)

(52) U.S. Cl.
CPC .................. *G06T 7/80* (2017.01); *G06T 7/11* (2017.01); *H04N 23/617* (2023.01);
(Continued)

(58) Field of Classification Search
None
See application file for complete search history.

(56) References Cited

U.S. PATENT DOCUMENTS 6,806,903 B1 * 10/2004 Okisu ............... H04N 1/387
348/E5.079
2003/0193604 A1 * 10/2003 Robins ............ G02B 27/0006
348/335

(Continued)

FOREIGN PATENT DOCUMENTS

JP    2001215170 A    8/2001
JP    2002300455 A    10/2002

(Continued)

OTHER PUBLICATIONS

Einecke et al., Detection of Camera Artifacts from Camera Images, 2017 IEEE 17th International Conference on Intelligent Transportation Systems (ITSC), Oct. 8-11, 2014, pp. 603-610 (8 pages), Qingdao, China.

(Continued)

*Primary Examiner* — Mark T Monk
(74) *Attorney, Agent, or Firm* — DICKINSON WRIGHT PLLC

(57) ABSTRACT

A computer-implemented method for determining whether a camera component of a camera is damaged is described. The method comprises obtaining information relating to one or more damage indicators; obtaining, from the camera, at least one image which has been taken when light from a light source has been incident on the camera component; dividing the image into one or more areas; analysing each area to determine whether it comprises at least one of the one or more damage indicators; and based on said analysing, providing an indication of whether the camera component is classified as damaged or undamaged.

48 Claims, 12 Drawing Sheets

(51) Int. Cl.
  *H04N 23/617*  (2023.01)
  *H04N 25/61*   (2023.01)
(52) U.S. Cl.
  CPC ... *H04N 25/61* (2023.01); *G06T 2207/20021* (2013.01); *G06T 2207/20081* (2013.01); *G06T 2207/20084* (2013.01)

(56) References Cited

U.S. PATENT DOCUMENTS

| | | | |
|---|---|---|---|
| 2008/0273117 A1 | 11/2008 | Nilsson | |
| 2015/0294455 A1* | 10/2015 | Lee | H01L 22/20 |
| | | | 382/112 |
| 2017/0177939 A1* | 6/2017 | Beall | G06V 10/143 |
| 2018/0089822 A1 | 3/2018 | Nirmal et al. | |

FOREIGN PATENT DOCUMENTS

| | | |
|---|---|---|
| JP | 2004317377 A | 11/2004 |
| JP | 2005201679 A | 7/2005 |
| JP | 2008164461 A | 7/2008 |
| JP | 2015534734 A | 12/2015 |

OTHER PUBLICATIONS

International Preliminary Report on Patentability issued Dec. 2, 2021 (Dec. 2, 2021) on related international patent application PCT/EP2020/061199 by the International Bureau of WIPO.
Japanese Office Action / Notice of Reasons for Refusal mailed Jan. 30, 2024 (Jan. 30, 2024), 15 pages, issued on related Japanese Patent Application 2021-569478, by the Japanese Patent Office.

\* cited by examiner

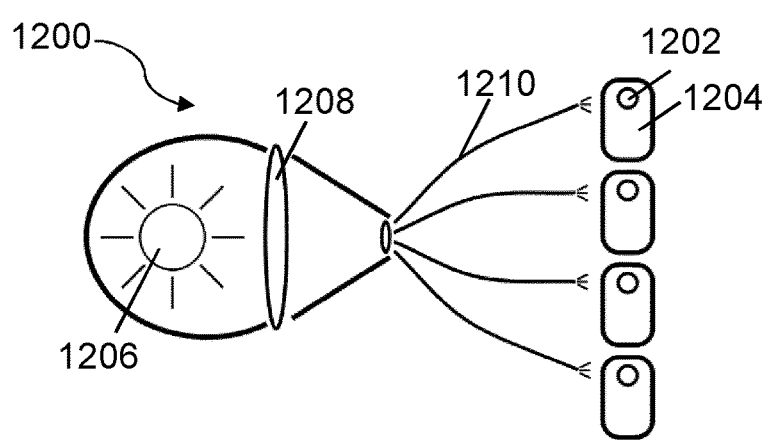
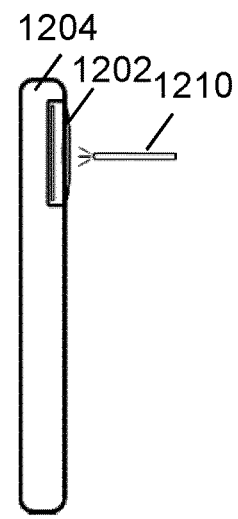
Fig. 12            Fig. 13
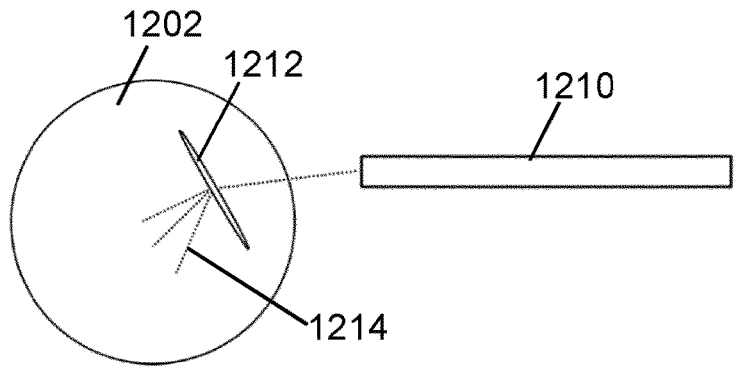
Fig. 14
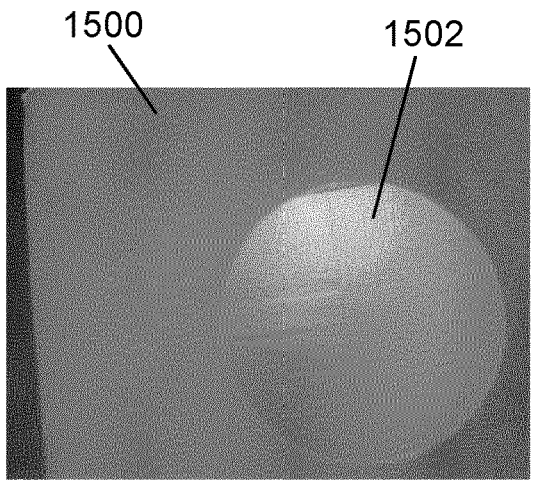
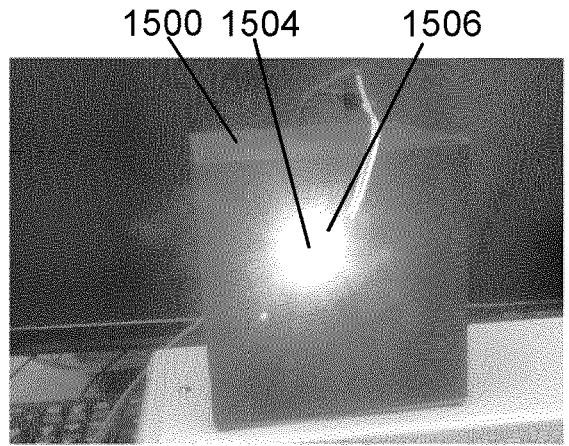
Fig. 15A            Fig. 15B

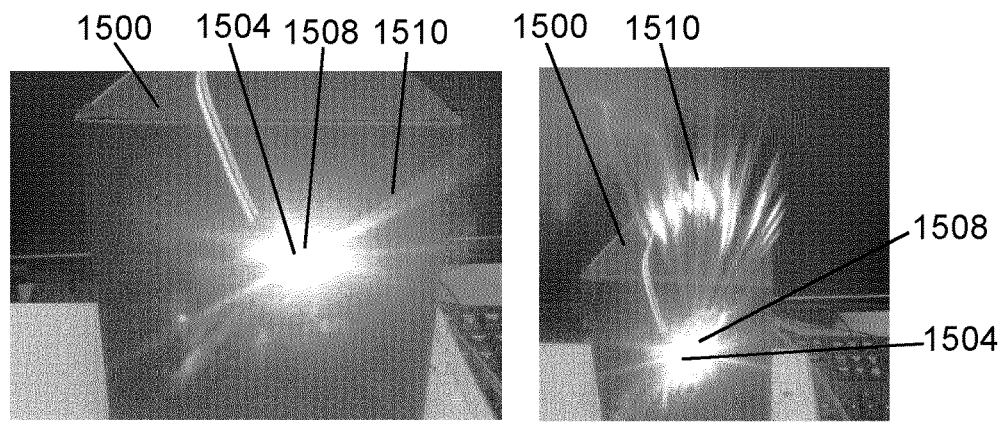
Fig. 15C
Fig. 15D
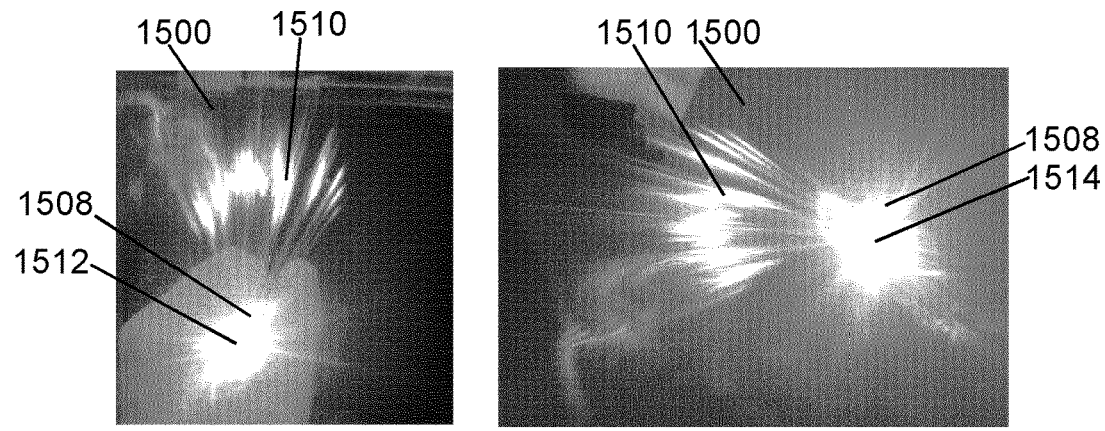
Fig. 15E
Fig. 15F
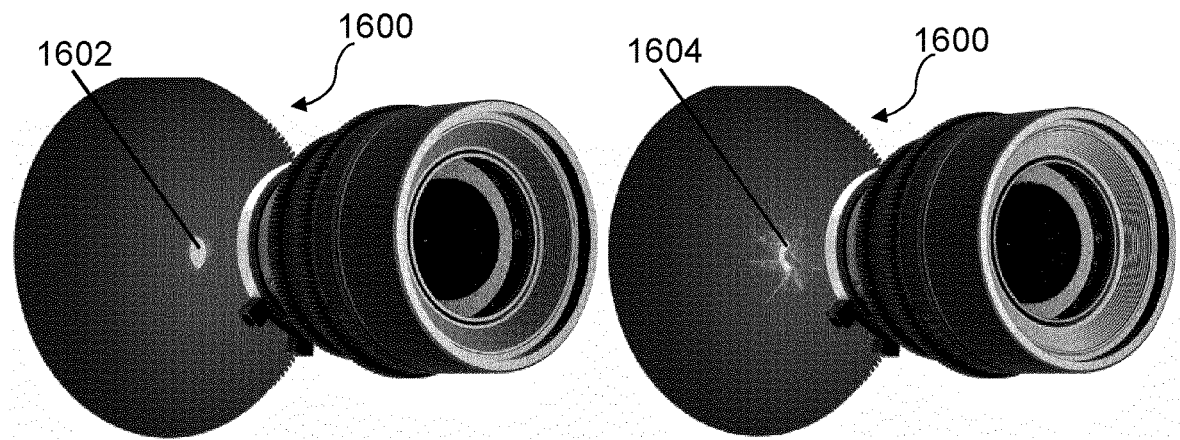
Fig. 16A
Fig. 16B

SYSTEM AND METHOD FOR DETERMINING WHETHER A CAMERA COMPONENT IS DAMAGED

CROSS REFERENCE TO RELATED APPLICATIONS

This application is a U.S. National Phase patent application of and claims priority to PCT Application No. PCT/EP2020/061199, filed Apr. 22, 2020, which claims priority to and the benefit of United Kingdom Patent Application 1907221.4 filed on May 22, 2019, each of the foregoing applications being fully incorporated herein by reference for all purposes.

FIELD OF THE INVENTION

The present invention relates to a system and computer-implemented method for determining whether a camera component, such as a lens or window, is damaged.

BACKGROUND OF THE INVENTION

If a camera lens is fully functional and without defects, it will reflect or pass light in relatively uniform fashion. However, if the camera lens is damaged (e.g. scratched), the light passing through it will be distorted or offset in some way and this will affect the quality of the resulting image.

There are also some known optical effects that may make the captured image different from what is photographed. For example, most lenses have at least some vignetting, which means that the corners of a picture are less luminous than the centre of the picture. However, generally this error causes a luminosity difference of less than one Exposure Value (EV) between the corners and the centre and it is therefore not usually noticeable. Other well-known and common lens errors are barrel and pincushion distortions, which also alter the captured image, but again these errors are generally not strongly visible in photographs taken with a camera. Thus, although these types of optical effects can have an impact on a resulting photograph they, generally, do not mask a distortion caused by a lens defect.

Commonly, surface defects or structural defects in a camera lens cannot be reliably detected using existing solutions, as the resulting effect in a photograph is often too slight to notice. Even with a severely damaged lens, the resulting photo might still be above an acceptable level for a naked eye.

Current methods for diagnosing an in-built camera module of a mobile device prompt the user to take any photograph using the camera and then visually inspect that photograph. This method is hard to automate for a diagnostic system and cannot be used to detect surface defects or structural defects in the lens reliably.

Even if the user were to look at the lens itself, any surface defects or structural defects might not be visible to the naked eye.

US2018/0089822 discloses a system for diagnosing camera or display defects in a mobile device wherein the device display is arranged as a light source which is directed to the camera using a series of mirrors. However, this method cannot be used to diagnose the camera component individually, as defects in the display or some of the mirrors may also affect the quality of the photograph taken. Furthermore, this method requires use of a complicated test jig comprising multiple mirrors and requiring accurate alignment of the display and camera.

It is therefore an aim of the present invention to provide a system and method for determining whether a camera component is damaged, which aims to address the above problems.

SUMMARY OF THE INVENTION

In general terms, the present disclosure proposes a system and computer-implemented method for determining whether a camera component of a camera is damaged (i.e. defective) or undamaged (i.e. intact).

A first aspect of the invention provides a computer-implemented method for determining whether a camera component of a camera is damaged comprising:
  obtaining information relating to one or more damage indicators;
  obtaining, from the camera, at least one image which has been taken when light from a light source has been incident on the camera component;
  dividing the image into one or more areas;
  analysing each area to determine whether it comprises at least one of the one or more damage indicators; and
  based on said analysing, providing an indication of whether the camera component is classified as damaged or undamaged.

Thus, embodiments of the invention provide a method which allows for automated diagnostics of surface defects or structural defects in a camera component such as a lens or other transparent layer between the camera and the light-source. Advantageously, the method may be employed in a diagnostic system for checking camera components on mobile devices. For example, cracks or scratches in the lens or dislocation of the lens of a digital camera may be detected based on artefacts in the image taken, for example, as a result of internal reflections of light from the light source when incident on the camera component. Notably, the image is taken using the camera whose lens (or other camera component) is being diagnosed. Moreover, the present method does not require use of a complicated test jig including multiple mirrors and requiring accurate alignment of the camera.

The light from the light source may be directly incident on the camera component (i.e. without encountering an intermediate optical component such as a mirror).

In some embodiments, the information relating to one or more damage indicators comprises a known shape of the light source such that the one or more damage indicators correspond to a lack of a corresponding shape in the image; the image comprises an imaged shape resulting from the light-source; and the step of analysing each area comprises determining whether, based on the known shape of the light source, the imaged shape is as expected for the case when the camera component is undamaged and/or for the case when the camera component is damaged.

Expressed differently, there is provided a computer-implemented method for determining whether a camera component of a camera is damaged comprising:
  obtaining, from the camera, at least one image of a light-source with a known shape, the image comprising an imaged shape resulting from the light-source;
  analysing the image;
  determining whether the imaged shape is as expected for the case when the camera component is undamaged and/or for the case when the camera component is damaged; and
  providing an indication of whether the camera component is determined to be damaged or undamaged.

Thus, embodiments of the invention provide a method which may detect defects such as cracks or scratches in a lens or dislocation of a lens of a camera based on artefacts in a photograph taken of a light-source with a known shape. In some embodiments, the light-source may be a light-emitting diode (LED) producing an essentially hemi-spherical or circular area of light as observed by a camera.

The step of analysing the image may comprise digitally comparing the imaged shape with the known shape.

The step of analysing the image may comprise using a trained machine learning algorithm to classify the imaged shape as resulting from a damaged or undamaged camera component.

The machine learning algorithm may comprise a neural network.

The machine learning algorithm may comprise a deep learning algorithm.

The method may comprise:
extracting information from the imaged shape;
comparing the extracted information against one or more predetermined probability vectors to establish whether the imaged shape should be classified as damaged or undamaged; and
calculating a probability that the imaged shape is correctly classified.

The method may further comprise training the machine learning algorithm by providing multiple examples of imaged shapes from damaged and undamaged camera components.

During training, the machine learning algorithm may perform the following processes:
extracting information from the multiple examples;
transforming the extracted information into information matrices;
manipulating the information matrices into combined matrices; and
using the combined matrices to establish a probability vector for each classification.

The step of analysing the image may comprise using spatial mathematics to compare the imaged shape with the known shape.

The method may comprise generating an outline of the known shape on top of the imaged shape and calculating a percentage of bright pixels, from the imaged shape, that fit within the outline.

The step of generating an outline of the known shape on top of the imaged shape may comprise detecting a centre of the brightest area in the image, drawing the outline of the known shape around the centre, checking if the brightest area extends beyond the outline or checking if the brightest area does not extend to the outline and adjusting the size of the outline such that the brightest area extends to the outline in at least one direction.

The step of calculating a percentage of bright pixels, from the imaged shape, that fit within the outline may comprise determining a maximum luminosity of the imaged shape, determining the number of bright pixels within the outline having a luminosity within a predetermined threshold of the maximum luminosity, and dividing said number of bright pixels by a total number of pixels within the outline.

In some embodiments, the predetermined threshold may be determined by the user or by the machine learning algorithm. The predetermined threshold may be 90% of the maximum luminosity, for example.

According to an embodiment, the camera component may be determined to be damaged if the percentage of bright pixels from the imaged shape that fit within the outline is less than 90%.

The known shape may be a circle or an essentially round or elliptical area.

The images from damaged camera components may be further classified as resulting from defective or destroyed components.

The defective components may be further classified as scratched, dented, dislocated, distorted or opaque.

The camera component may be a camera lens, window or transparent front element or transparent protective cover.

A second aspect of the invention provides a non-transitory computer-readable medium comprising programming instructions operable by a processor to carry out the method of the first aspect.

A third aspect of the invention provides a system for determining whether a camera component of a camera is damaged comprising:
the non-transitory computer-readable medium according to claim 19, operable by a processor associated with the camera or a diagnostic processor when in communication with the camera; and
at least one light-source with a known shape.

The system may further comprise a neutral background such that the light-source is considerably more luminous than the background. According to an embodiment, the light-source is at least 10 times more luminous than the background.

The background may comprise a contrasting focal feature thereon for the camera to focus on when taking the image.

The system may further comprise a holder and/or robotic arm configured to position the camera for taking the image of the light-source.

The camera may be provided on a mobile device.

The system may further comprise the diagnostic processor and a communication means for communication with the camera.

The system may comprise multiple light-sources, each having a known shape, provided within a field of view of the camera and a controller configured to turn each individual light-source on and off such that only one of the multiple light-sources is active when an image is taken.

In some embodiments of the first aspect of the invention, the light source is present in a field of view of the camera and in other embodiments the light source is in a vicinity of the field of view, when the image is taken.

The method may further comprise taking the image.

The one or more damage indicators may comprise one or more artifact, pattern, contrast change, saturated region, blurred area, chromatic effect, light streak or other symptom.

The step of analysing each area may comprise using a statistical analysis to determine whether at least one of the one or more damage indicators is present.

The step of analysing each area may comprise calculating an optical parameter for each area and determining whether each optical parameter is indicative of at least one of the one or more damage indicators.

The optical parameter may comprise one or more of: a colour; a wavelength; a luminosity; an intensity; a brightness or a contrast.

The method may comprise calculating an average optical parameter for each area and determining whether each average optical parameter is indicative of at least one of the one or more damage indicators.

The method may comprise determining a percentage of a total number of pixels within each area, for which the optical parameter is within a predetermined range.

The predetermined range may be 90% or more of an expected optical parameter.

The step of analysing each area may comprise using a trained machine learning algorithm to classify each area as comprising none of the one or more damage indicators or at least one of the one or more damage indicators.

The machine learning algorithm may comprise a neural network or a deep learning algorithm.

The method may comprise: extracting information from each area; comparing the extracted information against one or more predetermined probability vectors to establish whether the area should be classified as comprising none of the one or more damage indicators or at least one of the one or more damage indicators; and calculating a probability that the area is correctly classified.

The method may further comprise training the machine learning algorithm by providing multiple examples of images from damaged and undamaged camera components.

During training, the machine learning algorithm may perform the following processes: extracting information from the multiple examples; transforming the extracted information into information matrices; manipulating the information matrices into combined matrices; and using the combined matrices to establish a probability vector for each classification.

The method may further comprise negating a light source in the image by: determining a brightest region corresponding to an area of greatest intensity in the image and all adjacent areas having an intensity in a pre-determined range of the greatest intensity; and excluding the brightest region from the step of analysing each area.

The image may comprise a neutral background.

The method may comprise calculating a percentage of the areas determined as comprising at least one of the one or more damage indicators, compared to all areas of a single image, and classifying the camera component as damaged if the percentage is at least 1%, 2%, 5% or 10%.

The method may further comprise classifying damaged camera components as defective or destroyed.

The method may further comprise classifying defective components as scratched, dented, dislocated, distorted or opaque.

The camera component may be a camera lens, window or transparent front element or transparent protective cover.

A fourth aspect of the invention provides a non-transitory computer-readable medium comprising programming instructions operable by a processor to carry out any of the methods described above.

A fifth aspect of the invention provides a system for determining whether a camera component of a camera is damaged comprising: the non-transitory computer-readable medium according to the fourth aspect, operable by a processor associated with the camera or a diagnostic processor when in communication with the camera.

The system may further comprise a light source arranged to provide light incident on the camera component.

The system may comprise a fibre optic cable arranged to direct light from the light source to the camera component.

The light source may be arranged outside of a field of view of the camera.

The light source and/or camera may be movable such that different images can be taken at different angles of illumination.

The light source may be a white light source. According to an embodiment, the colour or the wavelength of the light source may be adjustable such that different images can be taken in different lighting conditions.

The system may comprise a controller configured to activate said light source when an image is taken.

The system may further comprise a focal feature for the camera to focus on when taking the image.

The system may further comprise a holder and/or robotic arm configured to position the camera for taking the image.

The camera may be provided on a mobile device.

The system may further comprise the diagnostic processor and a communication means for communication with the camera.

Multiple light sources may be arranged to provide light to the camera component and a controller may be configured to turn each individual light source on and off such that one or more of the multiple light sources is active when an image is taken. According to an embodiment, the colour or the wavelength of each or some of the multiple light sources may differ from the rest or some of the multiple light sources.

A sixth aspect of the invention provides a computer-implemented method for determining whether a camera component of a camera is damaged comprising:
performing the following steps:
obtaining information relating to one or more damage indicators;
obtaining, from the camera, at least one image which has been taken when light from a light source has been incident on the camera component;
dividing the image into one or more areas;
analysing each area to determine whether it comprises at least one of the one or more damage indicators; and
based on said analysing, providing an indication of whether the camera component is classified as damaged or undamaged; and/or
performing the following steps:
obtaining, from the camera, at least one image of a light-source with a known shape, the image comprising an imaged shape resulting from the light-source;
analysing the image;
determining whether the imaged shape is as expected for the case when the camera component is undamaged and/or for the case when the camera component is damaged; and
providing an indication of whether the camera component is determined to be damaged or undamaged.

A seventh aspect of the invention provides a non-transitory computer-readable medium comprising programming instructions operable by a processor to carry out the method of the sixth aspect of the invention.

An eighth aspect of the invention provides a system for determining whether a camera component of a camera is damaged comprising: the non-transitory computer-readable medium according to the seventh aspect, operable by a processor associated with the camera or a diagnostic processor when in communication with the camera.

Any features described above in relation to any of the first to fifth aspects may be combined with any of the sixth to eight aspects of the invention.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

BRIEF DESCRIPTION OF THE DRAWINGS

Non-limiting embodiments of the invention will now be described for the sake of example only, with reference to the following drawings in which:

FIG. 12 shows a schematic of a test set-up for testing cameras on multiple mobile devices in accordance with embodiments of the invention;

FIG. 13 shows a side view of a single mobile device camera being tested using a fibre optic light source;

FIG. 14 shows an enlarged schematic of a scratched lens being tested using a fibre optic light source;

FIGS. 15A, 15B, 15C, 15D, 15E and 15F show images using a test set-up in accordance with embodiments of the invention;

FIGS. 16A and 16B show the results of ray-tracing simulations for undamaged and damaged lenses;

DETAILED DESCRIPTION OF THE EMBODIMENT

Embodiments of the present invention relate generally to automated camera lens scratch diagnostics by geometrical referencing.

Surface defects or structural defects in flat, transparent surfaces, such as that of a camera lens or window, can be diagnosed using embodiments of the invention when a photograph is taken of a known shape of light-source (e.g. a round light emitting diode, LED) such that light travels from the light source to the camera through the camera component being diagnosed. A small light source such as an LED should look like a luminous circular area in the photograph taken, particularly if the LED is the only source of high brightness in the photograph. However, if the camera component is deformed, damaged or broken, the LED light source will not appear in the photograph as such a luminous circle, but as a different/distorted shape. Embodiments of the invention therefore provide a system and method to exploit this phenomenon to determine whether a camera component is damaged or not.

Figure 1:
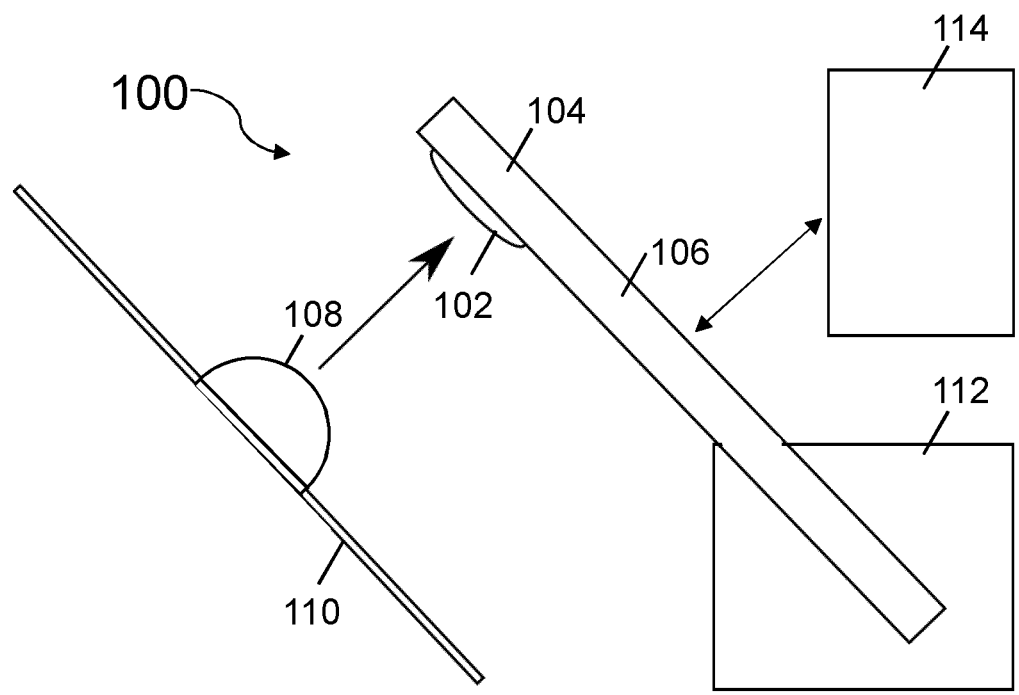
FIG. 1 shows a side view of a system for determining whether a camera component of a camera is damaged in accordance with an embodiment of the invention.

FIG. 1 shows a system 100 for determining whether a camera component 102 (e.g. a lens, window or transparent front element) of a camera 104 is damaged in accordance with an embodiment of the invention. The system 100 comprises a device under test 106 (which, in this case is a mobile device although in other embodiments may be a dedicated camera or other device including a camera) which is mounted in a holder 112 and is in communication with a diagnostic processor 114 configured to carry out a computer-implemented method for determining whether the camera component 102 is damaged. The computer-implemented method will be described in more detail below. However, it should be noted that the computer-implemented method may be encoded on a non-transitory computer-readable medium such that either the diagnostic processor 114 may carry out the method or a processor within the device under test 106 may carry out the method. For example, instructions for carrying out the computer-implemented method may be downloaded to a memory of the device under test 106 such that no separate diagnostic processor 114 is required. Thus, embodiments of the invention relate to both diagnostic hardware (i.e. in the form a diagnostic processor 114) and diagnostic software configured to carry out the computer-implemented method.

In some embodiments, the system 100 may include a robotic arm (not shown) which is configured to either position the device under test 106 in the holder 112 or directly hold the device under test 106 for the taking of an image. In other embodiments, a user may hold the device under test 106 without the need for the holder 112.

The system 100 also comprises at least one light-source with a known shape. In this embodiment, the light-source is a round LED which is configured to produce a circular area of brightness 108 when viewed from the camera 104. The LED is mounted on a board 110 as shown in more detail in FIG. 2. However, in some embodiments the board 110 is not required.

Figure 2:
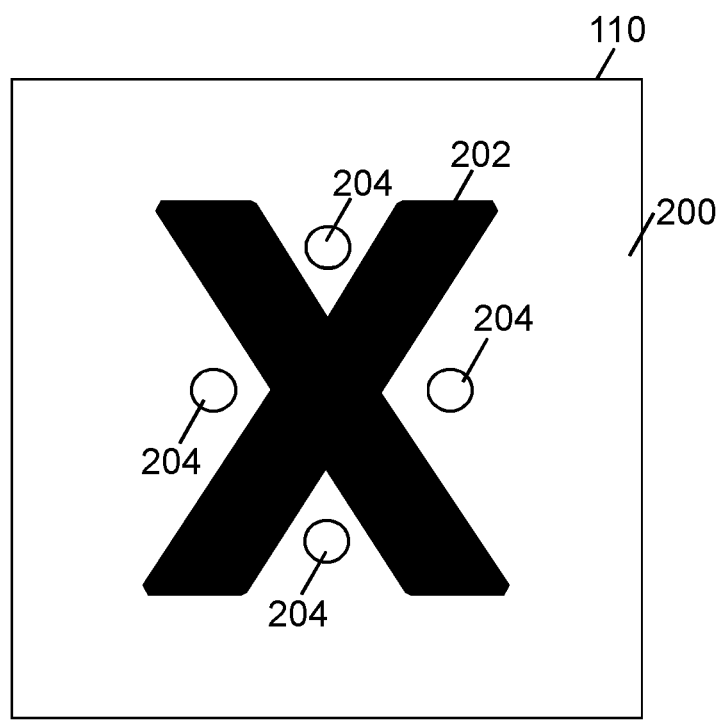
FIG. 2 shows a front view of the board and light-sources used in the system of FIG. 1.

As shown in FIG. 2, the board 110 comprises four LEDs 204, each one being provided in a space formed by a black marker "X" 202 to form a diamond pattern. Although not illustrated, the board 110 comprises a neutral dull grey background 200 of uniform colour and brightness, thus forming a so-called "grey card". The grey background 200 helps to ensure that the LEDs 204 (when active) are the only source of brightness in the images taken by the device under test 106 so that the imaged shape of an individual LED 204 is clearly discernible. In some embodiments the LEDs 204 may be at least 10 times, at least 100 times or at least 1000 times more luminous than the grey background 200. In some embodiments the luminosity of the LEDs 204 may be adjustable. Furthermore, the colour of the background 200 need not be grey as long as it is relatively uniform and less luminous than the LEDs 204.

The black marker "X" 202 constitutes a contrasting focal feature on the board 110 for the camera 104 to focus on when taking an image. In other embodiments, a different focal feature may be provided.

In the present embodiment, the four LEDs 204 were mounted on a simple breadboard and driven by a microcontroller (not shown) configured to turn each individual LED 204 on and off such that only one of the four light-sources is active when an image is taken. For example, one LED 204 is turned on for three seconds and off for one second before the next LED 204 is turned on for three seconds and off for one second and so on until the power is switched off. In other embodiments a different number of light-sources may be employed and/or a different control sequence may be used.

Figure 3:
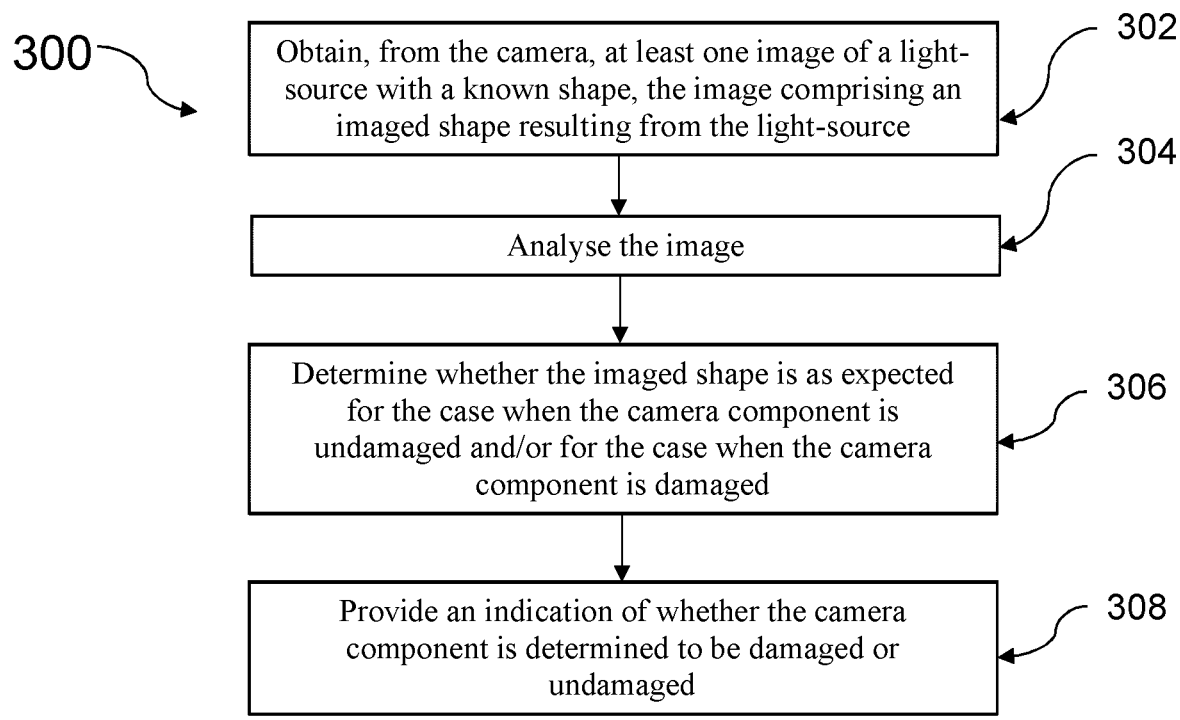
FIG. 3 shows steps of a method for determining whether a camera component of a camera is damaged in accordance with an embodiment of the invention, and which may be performed by the device of FIG. 1.

FIG. 3 shows steps of a computer-implemented method 300 (referred to above) for determining whether the camera component 102 of a camera 104 is damaged in accordance with an embodiment of the invention. As explained above, the method 300 may be performed by the device under test 106 or the diagnostic processor 114 of FIG. 1.

The method 300 comprises a first step 302 of obtaining, from the camera 104, at least one image of a light-source 204 with a known shape 108, the image comprising an imaged shape resulting from the light-source 204 and a second step 304 of analysing the image. A third step 306 comprises determining whether the imaged shape is as expected for the case when the camera component 102 is undamaged and/or for the case when the camera component 102 is damaged. In a fourth step 308 the method 300 provides an indication of whether the camera component 102 is determined to be damaged or undamaged. Further details of particular embodiments will be described in more detail below.

In operation, defects such as surface defects, structural defects, misalignment or dislocation of a part in the camera component 102 of the device under test 106 can be identified by the following process. The system 100 of FIG. 1 is arranged by providing a light-source of known shape (i.e. round LED 204 which is embedded within or positioned in front of the grey background 200, with black marker "X" 202, on the board 110) and arranging the device under test 106 (including the camera component 102 of the in-built digital camera 104 which is to be checked) such that the light-source 204 and board 110 are in the camera's field of view. Ideally, the board 110 is orientated in a plane substantially parallel to a front face of the camera component 102, and orthogonal to an optical axis of the camera 104.

The device under test 106 may be placed in the holder 112 by an operator or by a robotic arm and may be fixed in position by the holder 112 itself or by one or more mechanical components such as clamps or fasteners.

The device under test 106 is then connected to diagnostic software configured to carry out the method 300 of FIG. 3. This may involve the device under test 106 downloading the diagnostic software into its memory or by connecting the device under test 106 to the diagnostic processor 114 (either through a wired or wireless connection). The step of connecting the device under test 106 to the diagnostic processor 114 may be performed automatically such that the diagnostic processor 114 automatically detects the presence of the device under test 106 once it is placed into the holder 112. According to another embodiment, this step may be performed manually such that an operator makes the necessary connections by using a USB cable, for example, and/or initiates the connection from a user interface connected to the diagnostic processor 114 or device under test 106.

Similarly, a connection is made between the diagnostic software and the camera 104 of the device under test 106. This connection may be performed automatically such that the diagnostics software automatically detects whether the device under test 106 includes a camera 104 and then connects to the camera 104 using interfaces built into an operating system (OS) of the device under test 106.

The diagnostic software may then operate the camera 104 to take one or more photographs of the light-source 204. This will involve the camera 104 focussing on the black marker "X" 202 and capturing an image including the light-source 204. In some embodiments, the required photographs may be taken automatically by the diagnostics software while in other embodiments the diagnostic software may guide an operator to take the required photographs via a user interface to the device under test 106 or diagnostic processor 114. Thus, the step 302 of obtaining, from the camera 104, at least one image of the light-source 204 with a known shape 108 may be fulfilled either by the diagnostic software directly taking an image using the camera 104 or by the device under test 106 transferring an image taken by the camera 104 to the diagnostic software or diagnostic processor 114.

Next, the image will be analysed. This may be performed by the diagnostic software within the device under test 106 or by transferring the image to the diagnostic processor 114 for analysis. In either case, the imaged shape is analysed to determine whether it is as expected for the case when the camera component 102 is undamaged and/or for the case when the camera component 102 is damaged. In other words, the diagnostic software checks whether the image of the round LED 204 is rendered essentially circular or distorted. Of course, in other embodiments a different known shape of light-source may be employed (e.g. elliptical, triangular, square, rectangular etc.) and the analysis will check whether the rendered image is as expected for such a shape. The analysis may be performed, for example, using spatial mathematics or machine learning as explained in more detail below.

Finally, an indication of whether the camera component 102 is determined to be damaged or undamaged is provided. This indication or diagnostic verdict may take the form of an audible and/or visible alert, especially in the case where the camera component 102 is determined to be damaged.

In some embodiments, the diagnostic verdict may be displayed to the operator and may comprise a simple overall grade, a sparse detailed grade, a very detailed grade, or a full report of parameters affecting the grading. For example, the camera component 102 may be classified as intact, scratched, destroyed, dented, dislocated, distorted or opaque. These results may be shown on a screen of the device under test 106, via the user interface of the diagnostic processor 114, or in a separate report provided by the diagnostics software.

The results of the analysis of the images, or the images themselves, may be transferred from the device under test 106 to a remote server (e.g. on which the diagnostic processor 114 is provided) with assistance or input from the operator, or automatically by the diagnostics software.

Figure 4A:
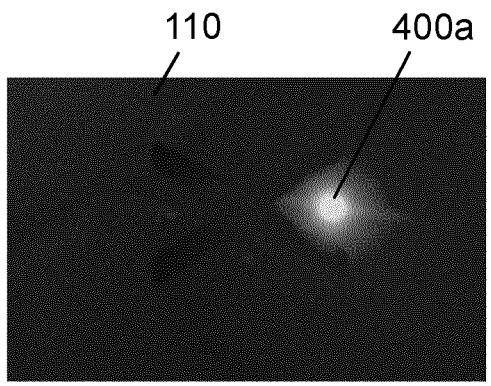
FIG. 4A shows an image of the board of FIG. 2 captured using an undamaged camera component in accordance with an embodiment of the invention.

For reference, FIG. 4A shows an image of the board 110 and one LED 204 light-source of FIG. 2 captured using an undamaged camera component 102 (intact lens) in accordance with an embodiment of the invention. Thus, it can be seen that the imaged shape 400a from the LED 204 is essentially round.

Figure 4B:
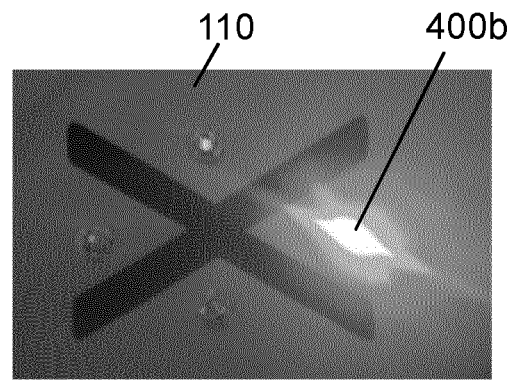
FIG. 4B shows an image of the board of FIG. 2 captured using a damaged camera component in accordance with an embodiment of the invention.

FIG. 4B shows an image of the board 110 and same LED 204 light-source of FIG. 2 captured using a damaged camera component 102 (scratched lens) in accordance with an embodiment of the invention. Thus, it can be seen that the imaged shape 400b from the LED 204 is not round but rather elongate.

The following examples will detail how the above images can be analysed automatically to determine whether the camera component 102 is damaged or undamaged in accordance with embodiments of the invention.

EXAMPLES

Figure 5A:
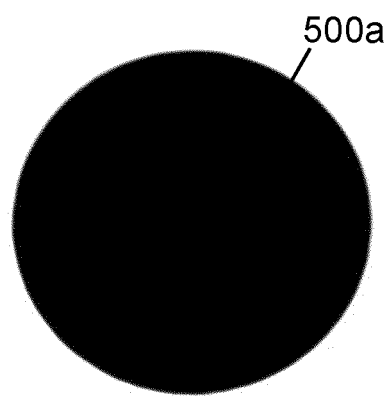
FIGS. 5A, 5B and 5C show examples of captured light-source images for undamaged camera components.
Figure 5B:
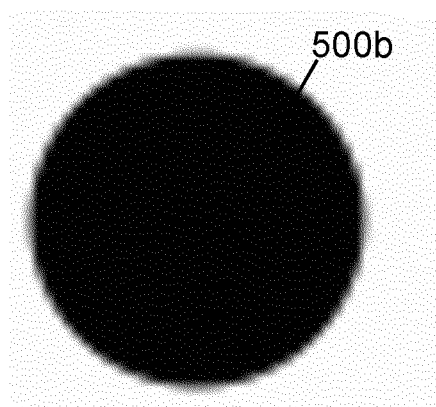
Figure 5C:
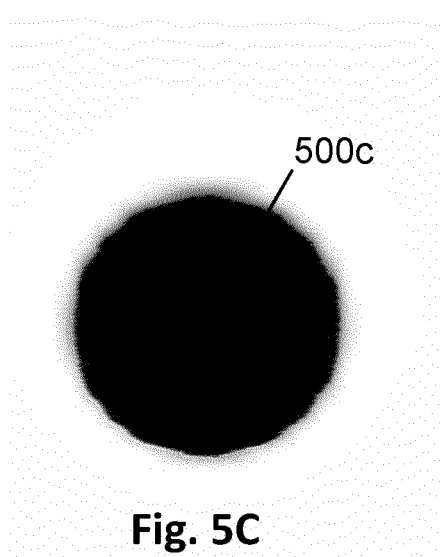

A number of images were generated using graphics creation software to illustrate potential captured images of the round LED 204 from intact, scratched and destroyed lenses. Thus, FIGS. 5A, 5B and 5C show respective examples of captured light-source images 500a, 500b and 500c for undamaged camera components 102. Each of these images 500a, 500b and 500c are essentially round. For the purposes of this example, 232 images of the type shown in FIGS. 5A, 5B and 5C were generated, all of which comprised a roundish shape but all were slightly different.

Figure 6A:
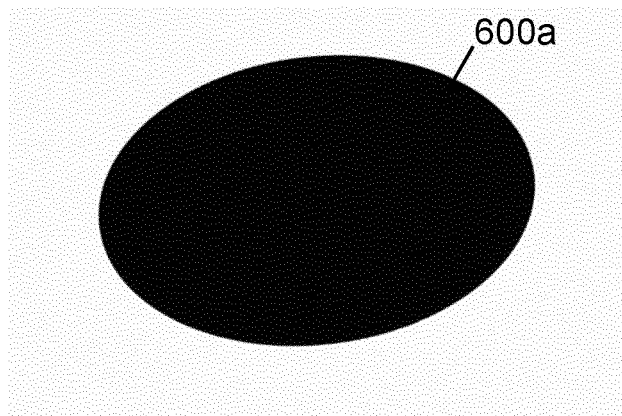
FIGS. 6A, 6B and 6C show examples of captured light-source images for scratched camera components.
Figure 6B:
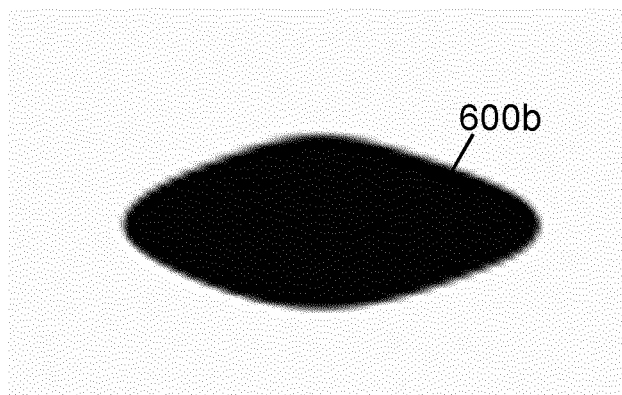
Figure 6C:
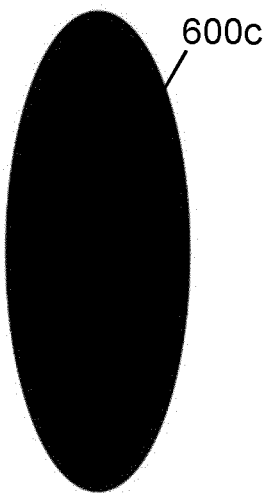

FIGS. 6A, 6B and 6C show respective examples of captured light-source images 600a, 600b and 600c for scratched camera components 102. Each of these images 600a, 600b and 600c has a round shape which is stretched or deformed in some way. For the purposes of this example, 35 images of the type shown in FIGS. 6A, 6B and 6C were generated, all of which comprised a round shape stretched or deformed in a different way.

Figure 7A:
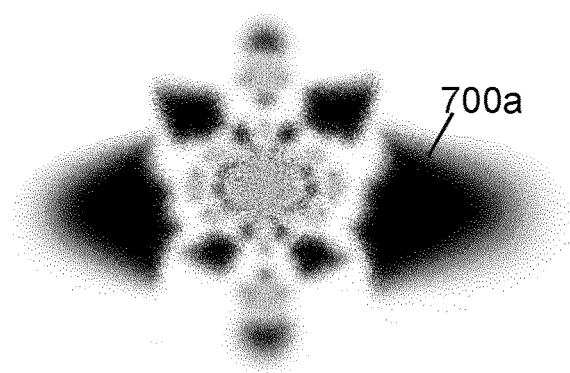
FIGS. 7A, 7B and 7C show examples of captured light-source images for destroyed camera components.
Figure 7B:
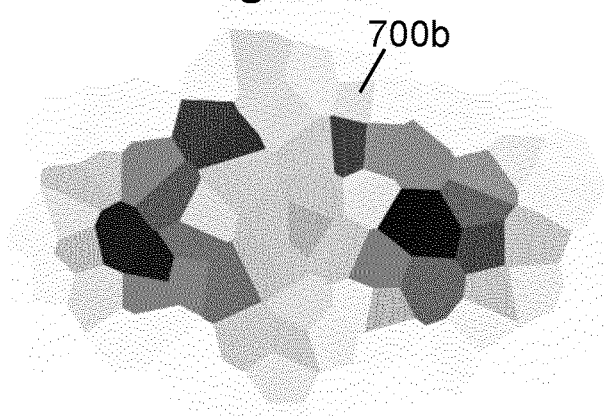
Figure 7C:
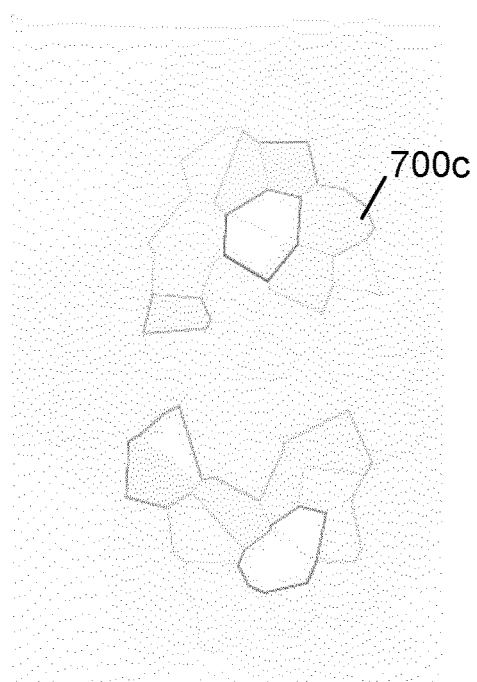

FIGS. 7A, 7B and 7C show examples of captured light-source images 700a, 700b and 700c for destroyed camera components 102. Each of these images 700a, 700b and 700c has a very badly deformed and broken shape. For the purposes of this example, 6 images of the type shown in FIGS. 7A, 7B and 7C were generated, all of which comprised badly deformed and broken shapes.

Use of the above images is described below for different analysis techniques.

Spatial Mathematics Approach

The step of analysing the photographs taken through the camera component 102 of the device under test 106 may be performed, for example, with mathematical calculus, where a circular light source (e.g. LED 204) is approximated with an equation. Solving the equation with parameters extracted from photographs taken through the camera component 102 gives a result that may be compared with a known reference value. A match with the reference value indicates an intact camera component 102 (e.g. lens) while a deviation from the reference value indicates a faulty camera component 102 (e.g. lens).

More specifically, the step of analysing the photographs using a spatial mathematics approach may comprise the following steps:

1) Detect a centre of the brightest area in the captured image;
2) Place a (mathematical) marker at said centre (e.g. by noting the x and y coordinates of the centre pixel);
3) Draw a ring around the said centre pixel and check if the bright area extends beyond the ring in at least one direction;
4) Increase the size of the ring until the bright area no longer extends beyond the border of the ring; and
5) Calculate the percentage of very bright pixels inside the ring (e.g. the percentage of pixels having a luminosity greater than a pre-determined value such as those having a luminosity at least 90% as bright as the maximum luminosity). If the device under test 106 is intact, the percentage should be close to 100%. If the device under test 106 is damaged, the percentage should be much lower.
6) Apply a rule for deciding whether the lens is damaged or not. For example, if the percentage of bright pixels within the ring is less than 90%, the lens may be considered scratched and if the percentage of bright pixels within the ring is less than 40%, the lens may be considered destroyed.

Figure 8A:
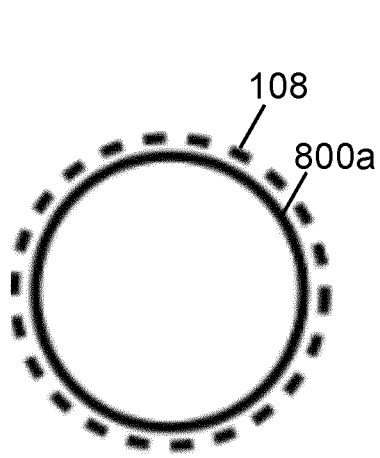
FIG. 8A shows a schematic representation of a geometrical analysis of a captured light-source image for an undamaged camera component in accordance with an embodiment of the invention.

FIG. 8A shows a schematic representation of a geometrical analysis of a captured light-source image 800a for an undamaged camera component 102 in accordance with an embodiment of the invention. In FIG. 8A, the captured image of FIG. 5A is shown with a solid line outline 800a. This captured image 800a has been surrounded with a dashed line that is perfectly round, indicating the shape 108 expected from the LED 204. Comparing the amount of pixels within the captured image 800a to the amount of pixels within the dashed line 108 there is only roughly a 5% difference. Thus, almost 100% of the area inside the dashed line 108 is occupied by bright pixels in the captured image 800a. This is within determined tolerances and therefore the captured image 800a is determined to be from an intact camera component 102.

Figure 8B:
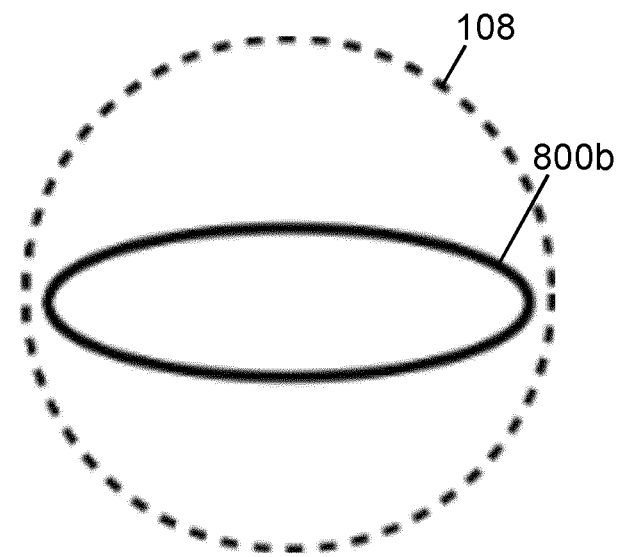
FIG. 8B shows a schematic representation of a geometrical analysis of a captured light-source image for a scratched camera component in accordance with an embodiment of the invention.

FIG. 8B shows a schematic representation of a geometrical analysis of a captured light-source image 800b for a scratched camera component 102 in accordance with an embodiment of the invention. In this case, the captured image of FIG. 6C is processed in the same way as above and is shown with a solid line outline 800b which is non-circular and results from a scratched lens. This captured image 800b has been surrounded with a dashed line that is perfectly round, indicating the shape 108 expected from the LED 204. Comparing the amount of pixels within the captured image 800b to the amount of pixels within the dashed line 108 there is approximately a 50% difference. Thus, according to the pre-set rules, the camera component 102 in this instance may be determined to be scratched.

In a real world case the pixels within the solid lines 800a and 800b would be bright pixels observed in the captured image that have a luminosity greater than a pre-determined value (for example, at least 90% as bright as the maximum luminosity).

In summary, this approach simply requires a measurement of the fraction of pixels inside the expected shape that are bright. In other words, the following formula is applied:

Measurement = Pixels in Bright Area/Pixels in Expected Area

Machine Learning Approach

In other embodiments, the step of analysing the photographs taken through the camera component 102 of the device under test 106 may be performed, for example, by means of machine learning via computer vision. In this case, an algorithm is taught by a sufficient set of photographs to identify flaws in the images, which is then used in grading defects in the camera component 102. As explained above, this analysis may be performed either by diagnostics software running on the device under test 106 or by a remote server or diagnostic processor 114, for example.

The machine learning algorithm may comprise a neural network or deep learning algorithm, for example. In the case of a neural network, the algorithm is first taught using example pictures such as those described above in relation to FIGS. 5A to 7C, before it is able to classify similar pictures with some efficiency.

In general, use of the machine learning algorithm may comprise:
1. Transforming the information contained in the training pictures into information matrices;
2. Manipulating the information matrices into combined matrices;
3. Using the combined matrices to form a probability vector;
4. Comparing information from a captured image against the probability vector; and
5. Classifying the captured image into a result class with accompanied probability information.

An example machine learning approach was taught using a random selection of 70% of the training pictures described above in relation to FIGS. 5A to 7C as training material and then using the remaining 30% of the pictures as examples of captured images to test the classification efficiency of the method.

Figure 9:
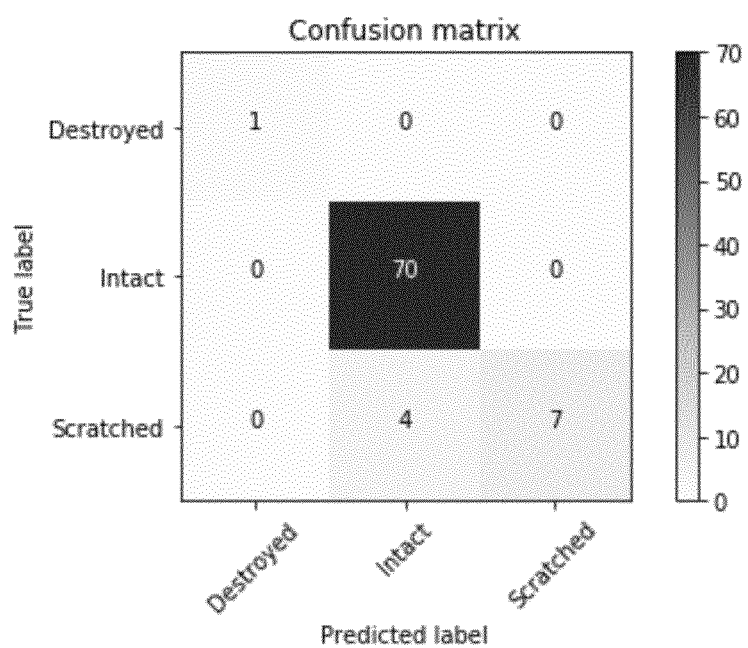
FIG. 9 shows a confusion matrix for a machine learning analysis of intact, scratched and destroyed camera components in accordance with an embodiment of the invention.

FIG. 9 shows a confusion matrix for the results of the machine learning analysis where the captured images were classified as being obtained using intact, scratched and destroyed camera components 204 in the form of camera lenses.

As can be seen, all "intact" lenses were correctly classified. Classification of "scratched" lenses was in this test case somewhat less reliable, as 4 out of 11 were incorrectly classified as "intact". In this case only one destroyed picture was in the sample, and it was correctly classified.

The classifier used in the present case was a known "Random Forest Classifier". Overall, the classification was 95.12% accurate and similar numbers can be expected in a real-world use case.

General Method

Aspects of the present invention relate, generally, to methods to incite inner reflections in a camera component such as a lens system (objective), to check their uniformity. As such, there is no real interest in the subject of the image but rather, the background of the image should be as featureless and uniform as possible, so as to enhance the image of reflections. By observing such reflections both in intact and damaged lens systems, it is possible to identify the differences in reflections, and determine the damaged lens system from the intact one. When enough samples are obtained, this decision may be automated via a suitable algorithm.

Thus, aspects of the invention provide a novel way to diagnose camera components, such as smartphone lenses, by using a high-quality light source and optionally fiber optics. Any lens defects will cause errors that can be detected using statistical spatial analysis or machine learning.

Figure 10:
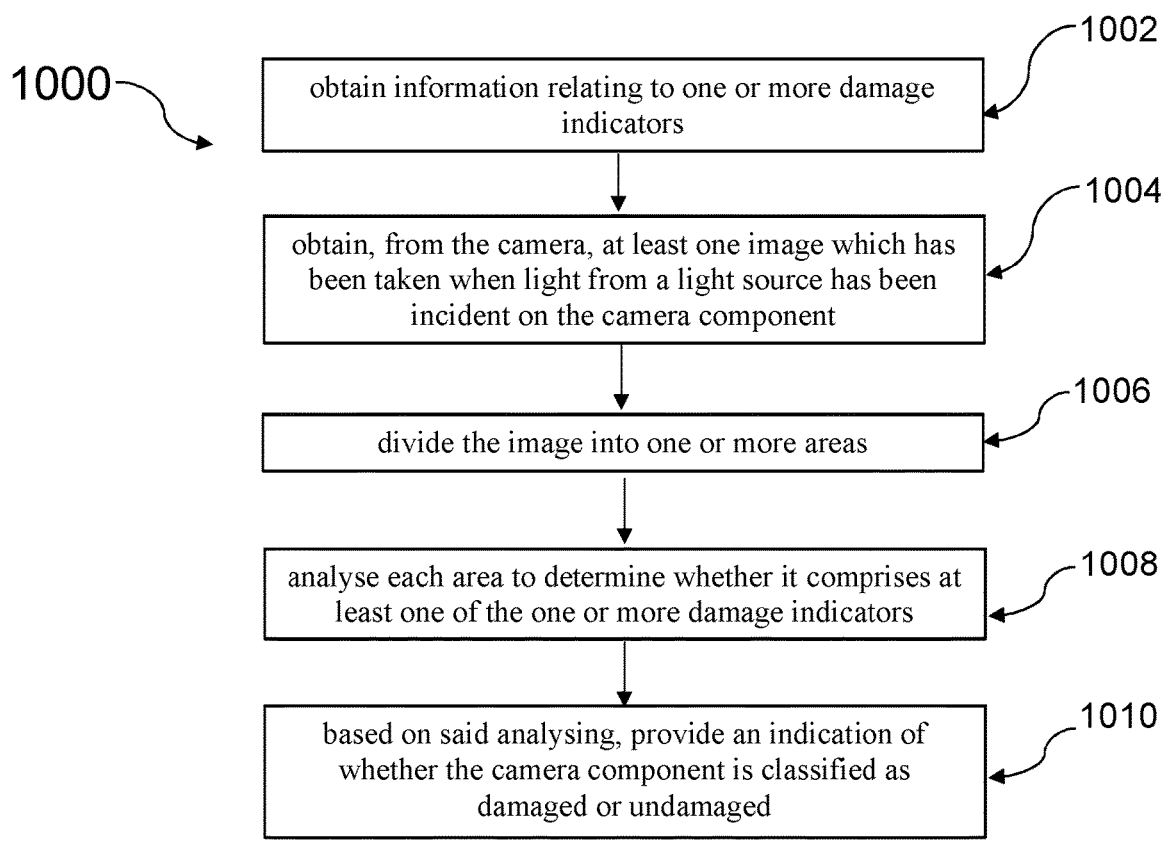
FIG. 10 shows steps of a method for determining whether a camera component of a camera is damaged in accordance with an embodiment of the invention.

FIG. 10 shows steps of a computer-implemented method 1000 for determining whether the camera component 102 of a camera 104 is damaged in accordance with embodiments of the invention. As per the method explained above, this method 1000 may be performed by the device under test 106 or the diagnostic processor 114.

The method 1000 comprises a first step 1002 of obtaining information relating to one or more damage indicators and a second step 1004 of obtaining, from the camera, at least one image which has been taken when light from a light source has been incident on the camera component. A third step 1006 requires dividing the image into one or more areas and a fourth step 1008 comprises analysing each area to determine whether it comprises at least one of the one or more damage indicators. A fifth step 1010 comprises providing an indication of whether the camera component is classified as damaged or undamaged, based on said analysing.

In the particular embodiments described below, the camera component is directly exposed to light from the light source, however, the shape of the light source need not be known. Thus, this technique may be used if a known light source not available. However, in some embodiments, the present technique may be employed alongside the above technique, using a known light source, to be able to identify other artefacts even if the imaged light source is of the expected shape.

Figures 11A, 11B, 11C:
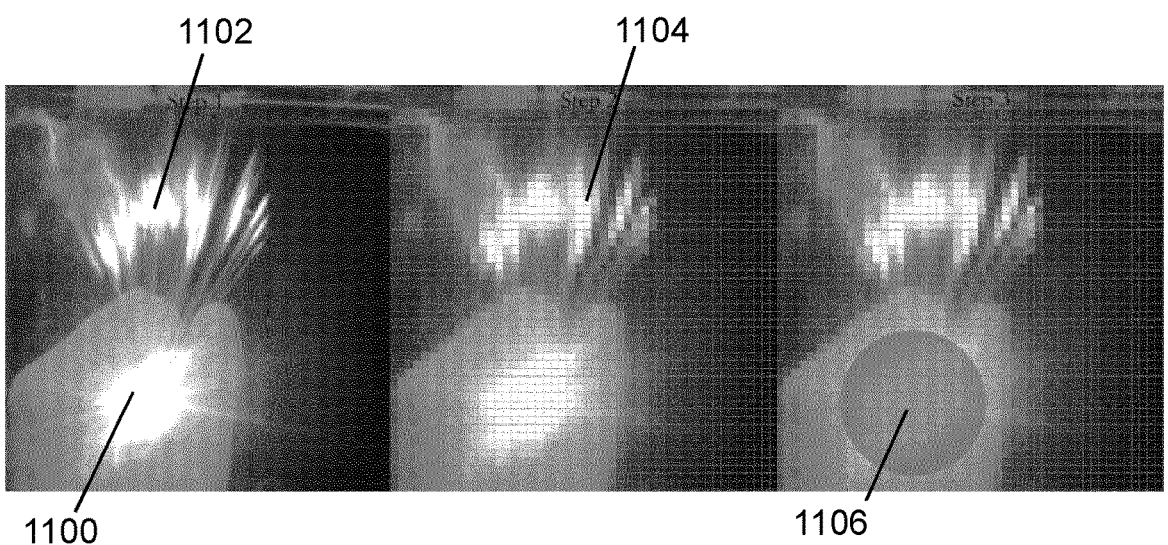
FIGS. 11A, 11B and 11C show analysis of an image in accordance with the method of FIG. 10.

In the embodiment illustrated in FIGS. 11A, 11B and 11C, the light source 1100 is provided in the field of view (FOV) of the camera (i.e. the FOV of a sensor or detector in the camera). However, in other embodiments the light source may be outside of the FOV of the camera (i.e. outside of the FOV of the sensor or detector) but still arranged to provide light directly onto the camera component being tested, as will be explained further below. In some embodiments, an operator may choose whether or not to include the light source in the FOV.

Ideally, the light source 1100 includes different wavelengths (i.e. is as close to natural/white light as possible to enable chromatic effects to be more easily identified). The light source 1100 should be brighter than ambient light (e.g. at least 10 times more luminous) and could be the sun or other source of bright light such as an LED or fibre optic light cable.

As illustrated in FIG. 11A, in first step, a picture/image is taken with the camera under test, so that the background of the picture is preferably of substantially uniform color. Additionally, there may be a focusing feature for the camera, for example an "X" printed on the uniform background, as above. In this embodiment, there is also one very bright small light source 1100 present in the image. If the camera component is damaged (as per FIG. 11A) the image will also show one or more damage indicators 1102, which may be in the form of light streaks, chromatic (i.e. rainbow) effects, blurriness or the like.

In a second step, shown in FIG. 11B, the image is divided into a plurality of areas, which in this case are small squares 1104. In other embodiments, the image may be divided into one or more areas using squares or other shapes. An optical parameter is then determined for each area. In this embodiment, an average RGB colour value is determined for each square 1104. In other embodiments, the intensity, of each area may be determined.

In a third step, shown in FIG. 11C, the largest and/or brightest continual area in the image is determined and disregarded from further analysis to mask out the light source from the image, if present in the FOV. In this case, a circle is used to mask out the light source 1100 in the image, although any shape could be used to mask the light source.

In a fourth step, not illustrated, a statistical analysis method and/or a machine learning technique is employed to classify each of the areas 1104 as either "expected" or "unexpected". In other words, each area 1104 is analysed to determine whether it comprises at least one damage indicator 1102. A damage indicator may take the form of a pattern, artefact, chromatic error (i.e. rainbow effect), saturated (i.e. burnt out) area or other symptom (e.g. a sharp contrast change between pixels or "blurriness") which may appear in images taken through a damaged camera component. For example, an optical parameter such as an average intensity, luminosity, colour or wavelength of the area may be determined and compared against a reference or threshold value to determine whether the area comprises at least one damage indicator 1102. In some embodiments, more than one optical parameter may be obtained to determine whether the area comprises one or more damage indicators 1102. Thus, a calibration or set-up procedure may be employed to obtain information relating to one or more damage indicators 1102 (i.e. to establish a normal or expected range of values for reference).

In some embodiment, a large data set of potential damage indicators would be provided to teach a machine learning algorithm to identify whether the presence of such damage indicators and thereby to determine whether a camera component is damaged or undamaged.

If all of the areas 1104 outside the light source are as expected (i.e. do not contain any damage indicators), a signal is communicated to the operator that the camera is fully functional. However, if one or more of the areas 1104 are not as expected (i.e. do contain damage indicators), a signal is communicated to the operator that the camera is damaged.

If the camera is classified as undamaged (i.e. functional) the process may end without the need for any human intervention.

If the camera is classified as damaged (e.g. broken), the operator may verify that the camera is not functioning as it should.

A benefit of such embodiments of the invention is that, in most cases, (e.g. for 90% to 95% of the cameras tested) no human intervention is needed to evaluate if the camera is intact or broken. In rare cases where the camera is broken, the operator can label it as broken and either send it to be repaired (if this is deemed worthwhile i.e. if the device is a relatively new and expensive model) or lower its price (if it is too cheap for the repairs to make sense).

Compared to the initial embodiments described above, this embodiment can detect wider range of errors. For example, dust in a lens array or dirt in a sensor should create artifacts that can be detected automatically using this method.

Thus far most smartphone camera lens diagnostic systems rely on visual inspection by human beings. This present embodiment can either make that visual inspection easier, or can fully automate the inspection by using an algorithm that detects when image artifacts appear as described above.

In some aspects of the invention, the method can be considered as a probability calculus exercise, since no lens is perfect. That being said, a threshold value may be set for an allowable defect probability. Consequently, the step of providing an indication of whether the camera component is classified as damaged or undamaged may comprise calculating a probability of a camera component defect based on, for example, a number of observed damage indicators when compared with the obtained information about damage indicators. The information may comprise a defect probability distribution based on a number of observed damage indicators. Further, the probability distribution might be specific to a type of damage indicator, in which case more than one probability distribution may be obtained. In some embodiments, this sort of probability calculus may be carried out by employing a machine learning algorithm, such that the estimate becomes more accurate as more information about damage indicators is accumulated.

FIG. 12 shows a schematic of a test set-up 1200 for testing cameras 1202 on a series of mobile devices 1204 in accordance with embodiments of the invention. The test set-up 1200 comprises a high quality light source 1206 which passes through a lens system 1208 and into a plurality of optical fibres 1210 which are arranged to direct light into each camera 1202 of each mobile device 1204.

FIG. 13 shows a side view of a single mobile device 1204 camera 1202 being tested using the optical fibre 1210 delivered light from the light source 1206. Although the light may, generally, be directed straight towards a center of a camera component (e.g. lens) being tested, in some embodiments, the light may be come from other angles, or it may be directed towards the camera component from several angles (e.g. by moving the light source or camera) to help catch any image artifacts.

FIG. 14 shows an enlarged schematic of a scratched lens 1202 being tested using an optical fibre 1210 light source. When the light encounters an error, such as scratch 1212, in the lens 1202, the light generally creates artifacts 1214 or damage indicators, which may take the form of prismatic effects or bright spots or streaks in a created image, which are clearly outside an area of brightness corresponding to the imaged light source if present in the FOV. Thus, enabling the system to detect the presence of damage indicators in accordance with the method of FIG. 10 in order to determine whether the camera is damaged or undamaged.

Even a relatively simple setup such as that described above with a high-quality light source may help an operator to spot lens errors that otherwise might be difficult to notice. In some embodiments, such lens error detection may be performed semi-automatically, possibly by using a robotics arm and an artificial intelligence system. This is faster and requires less workforce than fully manual camera optics testing.

FIGS. 15A, 15B, 15C, 15D, 15E and 15F show images taken using another test set-up in accordance with embodiments of the invention. In FIG. 15A an image is taken of a box 1500 with a hole 1502 in it, in ambient light, by a camera having a very damaged lens. However, no errors are visible.

FIG. 15B shows an image of the box 1500 with a bright light source 1504 in front, taken by a camera having an undamaged lens. This image shows a bright, substantially round area 1506 of light from the light source 1504.

FIG. 15C shows an image of the box 1500 with the bright light source 1504 in front, taken by a camera having a damaged (scratched) lens. This image shows a non-circular bright area 1508 and light streaks 1510 which can be identified as damage indicators indicative of the fact that the lens is damaged.

FIG. 15D shows an image of the box 1500 with the bright light source 1504 in front, taken by a camera having a more damaged lens. This image also shows a non-circular bright area 1508 and stronger light streaks 1510 (some of which show a chromatic rainbow effect) which can be identified as damage indicators indicative of the fact that the lens is damaged.

FIG. 15E shows an image of the box 1500 with a brighter light source 1512 in front, taken by the same camera used for FIG. 15D including a very damaged lens. This image also shows a non-circular bright area 1508 and strong light streaks 1510 (some of which show a chromatic rainbow effect) which can be identified as damage indicators indicative of the fact that the lens is damaged.

FIG. 15F shows an image of the box 1500 with a smaller light source 1514 in front, taken by the same camera used for FIGS. 15D and 15E including a very damaged lens. This image also shows a non-circular bright area 1508 and strong light streaks 1510 (some of which show a chromatic rainbow effect) which can be identified as damage indicators indicative of the fact that the lens is damaged.

It is noted that even with a very damaged lens, it is almost impossible to notice the damage by looking at the camera with the naked eye. The methods described in accordance with embodiments of the present invention therefore provide a useful and reliable tool for easily identifying damaged camera components.

FIGS. 16A and 16B show the results of ray-tracing simulations 1600 for undamaged and damaged lenses, respectively. The simulation utilized a 3D model of a lens in conjunction with ray tracing software to simulate how the lens works both when intact and when damaged. This example simulated a scene comprising one very small light source, the lens being tested and a wall behind the lens. Photons from the light source illuminated the lens externally and traveled through the lens. For each pixel in the simulated image, 100 000 samples were taken before the image was considered complete.

In the simulations, the wall behind the lens was burned totally white, except for a circular area that was in the shadow of the lens. In that area the image of the light source is visible, and additionally some stray photons can be seen.

As shown in FIG. 16A, when the lens is intact, the photons mostly concentrate in one bright spot 1602 behind the lens.

However, if the lens is damaged (i.e. geometry of the lens closest to the image sensor is altered) both the shape of the bright spot 1604 alters, and there are a lot more stray photons. In the real world those photons would cause chromatic errors in the image.

While alterations to the shape of the bright spot can be detected with the method described in FIG. 3, the method described in relation to FIG. 10 is better in detecting chromatic errors and other such flaws that may not significantly change the shape of the bright area.

Furthermore, in comparison to the embodiments described above in relation to FIG. 3, the present embodiment does not depend on use of a known light source. On the contrary, if the light source is in the captured image, it may be advantageous for it to be excluded or masked out.

Additionally, the scene of which the image is taken does not need to be known, but it only needs to satisfy certain conditions, such as there needs to be a light source in the scene or in its vicinity such that light travels from the light source to the camera component being tested.

FIGS. 17A, 17B, 17C, 17D and 17E show schematically apparatus configured for determining whether a camera component of a camera is damaged in accordance with embodiments of the invention.

Figure 17A:
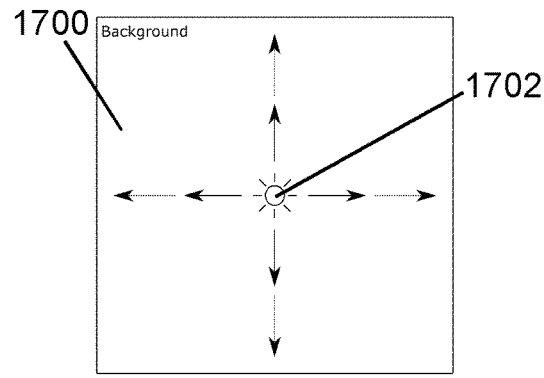
FIGS. 17A, 17B, 17C, 17D and 17E show schematically apparatus configured for determining whether a camera component of a camera is damaged in accordance with embodiments of the invention.

FIG. 17A shows a neutral background card 1700 with a small bright light source 1702 provided in front of the background 1700. In some embodiments, the light source 1702 may be moved in any direction in front of the background 1700 (e.g. horizontally, vertically or diagonally) whilst a series of images are taken so as to provide a higher chance of light entering the camera component being affected by any errors in the component. This is because defects in the lens may cause artefacts to appear only at a certain angle (i.e. when light reflected via the defective portion of the lens hits the camera sensor). Additionally, or alternatively, the camera component (or device on which it is provided) may be moved relative to the light source 1702 for the same reason.

Figure 17B:
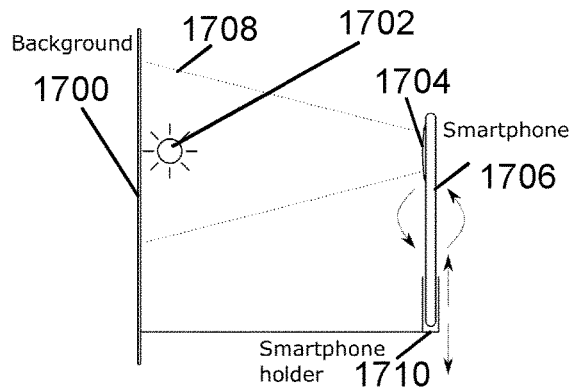
Figure 17C:
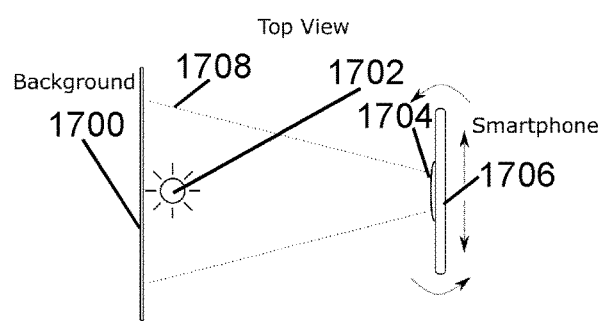

FIGS. 17B and 17C show a test set-up in which the light source 1702 is provided in front of the background 1700, in a field of view (FOV) 1708 of a camera component 1704 of a smartphone 1706. In this case, the smartphone 1706 is provided in a smartphone holder 1710, which is arranged to move the smartphone 1706 around three degrees of motion (i.e. vertically, horizontally and around a vertical axis) in order to take images including the light source 1702 for analysis in accordance with the invention.

Figure 17D:
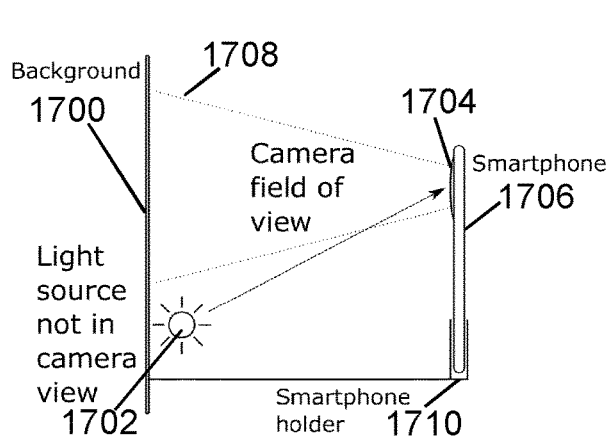

FIG. 17D shows another test set-up in which the light source 1702 is provided in front of the background 1700, but outside of the field of view (FOV) 1708 of the camera component 1704 of the smartphone 1706. As above, the smartphone 1706 is provided in the smartphone holder 1710, which is arranged to move the smartphone 1706 around three degrees of motion.

Figure 17E:
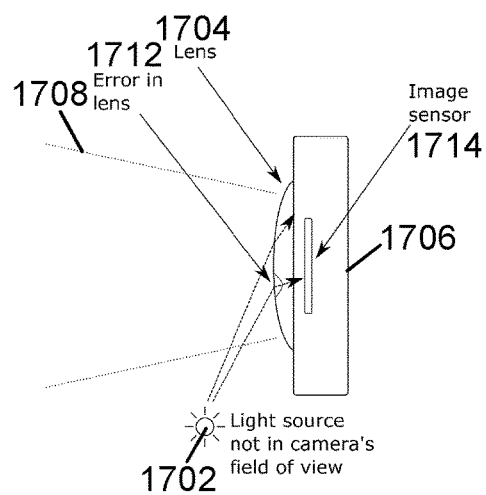

FIG. 17E shows a close-up view of a damaged lens camera component 1704 being tested using the set-up of FIG. 17D. Thus, although the light source 1702 is outside of the FOV 1708, it is clear that light from the light source 1702 is still incident on the camera component 1704 of the smartphone 1706. When light from the light source 1702 encounters a defect or error 1712 in the camera component 1704, at least some of the light may be directed towards an image sensor 1714 in the camera. Accordingly, the image will include artefacts or damage indicators indicative of a damaged camera component.

In some embodiments, the error 1712 in the lens may lead to a distorted rendering of the original light source 1702 and/or light streaks or chromatic errors.

FIGS. 18A, 18B, 18C, 18D, 18E, 18F, 18G and 18H illustrate various different artefacts that may be identified as damage indicators in embodiments of the invention to determine whether a camera component of a camera is damaged.

Figure 18A:
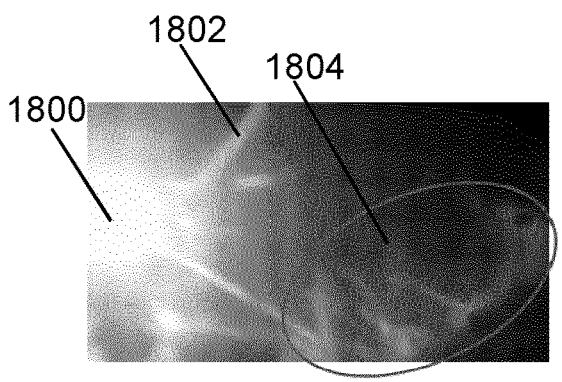
FIGS. 18A, 18B, 18C, 18D, 18E, 18F, 18G and 18H illustrate various different artefacts that may be used in embodiments of the invention to determine whether a camera component of a camera is damaged.
Figure 18B:
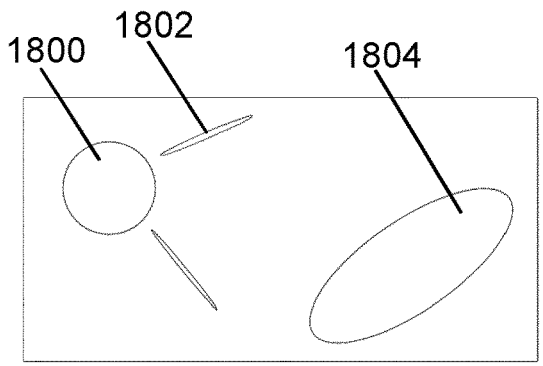

FIG. 18A shows an image comprising a light source 1800, light streaks 1802 and an area 1804 of unsharp light smearing or blurriness. FIG. 18B is a black and white line drawing representation of the image of FIG. 18A, which shows the location of the light source 1800, light streaks 1802 and area 1804 of unsharp light smearing or blurriness.

Figure 18C:
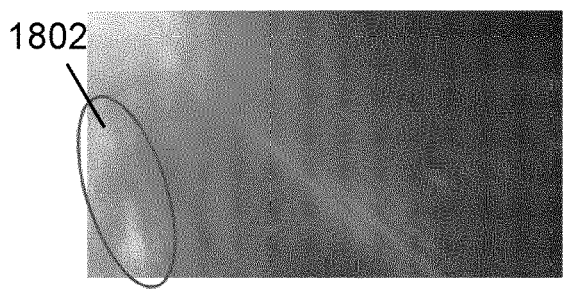
Figure 18D:
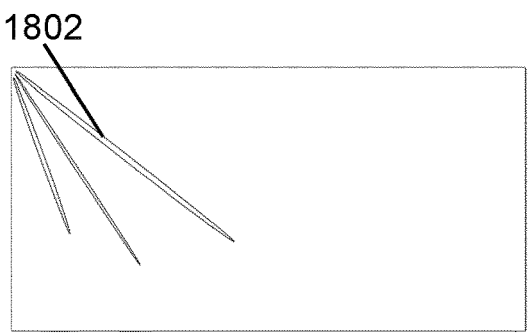

FIG. 18C shows an image taken with the light source outside of a field of view but which still shows light streaks 1802. FIG. 18D is a black and white line drawing representation of the image of FIG. 18C, which shows the location of the light streaks 1802.

Figure 18E:
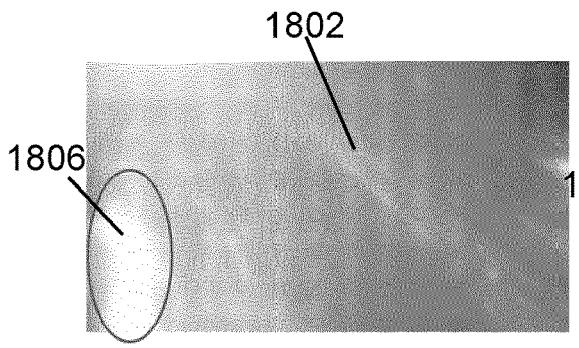
Figure 18F:
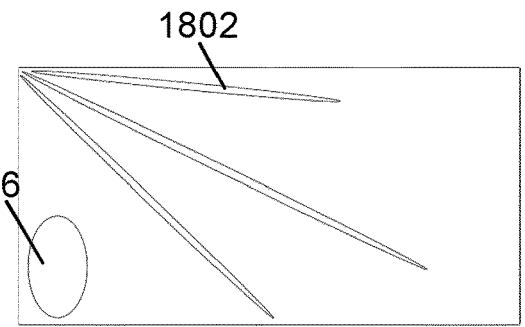

FIG. 18E shows an image taken with the light source outside of a field of view but which shows light streaks 1802 and a bright (saturated) area 1806. FIG. 18F is a black and white line drawing representation of the image of FIG. 18E, which shows the location of the light streaks 1802 and bright (saturated) area 1806.

Figure 18G:
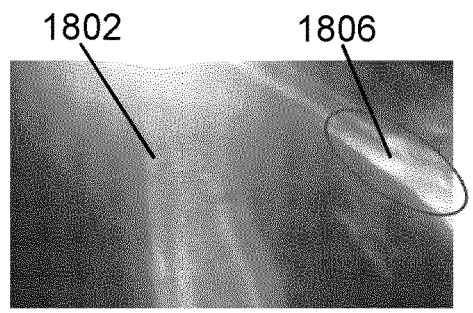
Figure 18H:
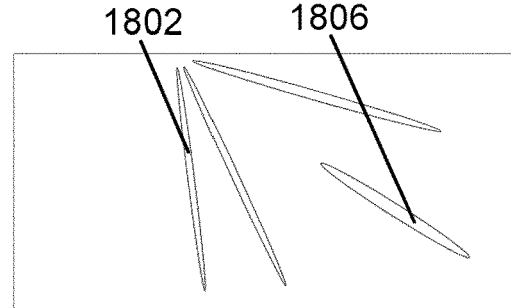

FIG. 18G shows an image taken with the light source at a top edge of a field of view and which shows a different kind of light streaks 1802 and a bright (saturated) area 1806. FIG. 18H is a black and white line drawing representation of the image of FIG. 18G, which shows the location of the light streaks 1802 and bright (saturated) area 1806.

Figure 19:
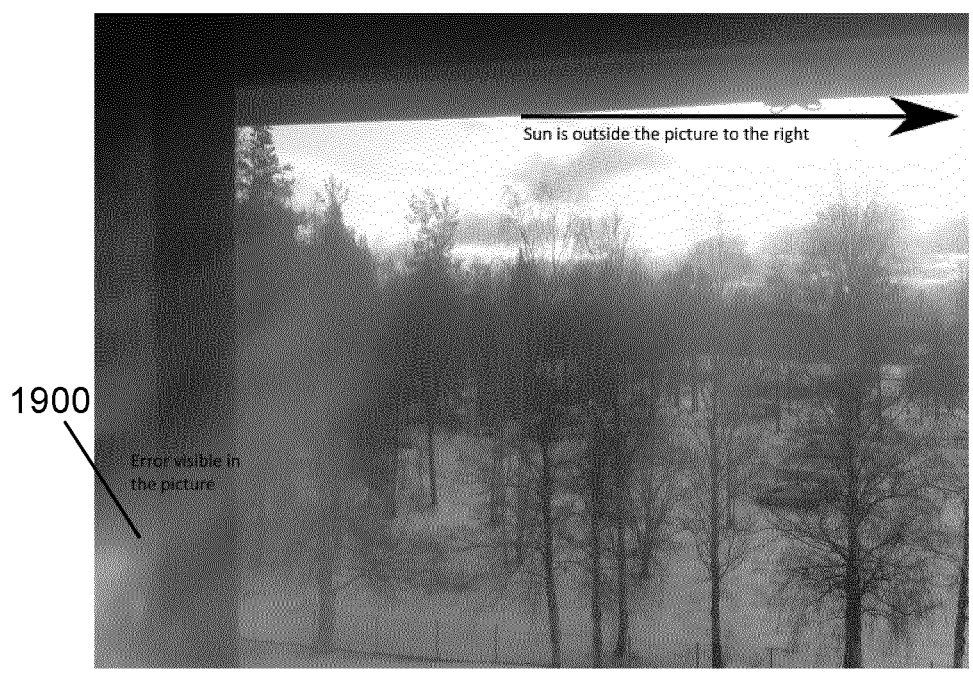
FIG. 19 shows an example image taken with the sun outside of the field of view of the camera but with artefacts present in the image which indicate damage to the camera component.

FIG. 19 shows an example image taken with the sun outside of the field of view of the camera but with artefacts in the form of blurred light streams 1900 present in the image which indicate damage to the camera component.

It will be understood that the images of the above figures may be analysed in embodiments of the invention to identify damage indicators and thereby determine whether the camera component is damaged or undamaged.

Whilst the foregoing description has described exemplary embodiments, it will be understood by those skilled in the art that many variations of the embodiments can be made within the scope of the present invention as defined by the claims. Moreover, features of one or more embodiments may be mixed and matched with features of one or more other embodiments.

The invention claimed is:

1. A computer-implemented method for determining whether a camera component of a camera is damaged comprising:
   obtaining information relating to one or more damage indicators;
   obtaining, from the camera, at least one image which has been taken when light from a light source has been incident on the camera component;
   dividing the image into one or more areas;
   analyzing each area to determine whether it comprises at least one of the one or more damage indicators;
   based on said analyzing, providing an indication of whether the camera component is classified as damaged or undamaged; and
   wherein:
   the information relating to one or more damage indicators comprises a known shape of the light source such that the one or more damage indicators correspond to a lack of a corresponding shape in the image;
   the image comprises an imaged shape resulting from the light source; and
   the step of analyzing each area further comprises determining whether, based on the known shape of the light source, the imaged shape is as expected for the case when the camera component is undamaged and/or for the case when the camera component is damaged.

2. The method according to claim 1 wherein the step of analyzing each area comprises: one or more of:
   digitally comparing the imaged shape with the known shape; and
   using spatial mathematics to compare the imaged shape with the known shape.

3. The method according to claim 2 comprising generating an outline of the known shape on top of the imaged shape and calculating a percentage of bright pixels, from the imaged shape, that fit within the outline.

4. The method according to claim 3 wherein the step of generating an outline of the known shape on top of the imaged shape comprises:
   detecting a center of the brightest area in the image;
   drawing the outline of the known shape around the center;
   checking if the brightest area extends beyond the outline or checking if the brightest area does not extend to the outline; and
   adjusting the size of the outline such that the brightest area extends to the outline in at least one direction.

5. The method according to claim 3 wherein the step of calculating a percentage of bright pixels, from the imaged shape, that fit within the outline comprises determining a maximum luminosity of the imaged shape, determining the number of bright pixels within the outline having a luminosity within a predetermined threshold of the maximum luminosity, and dividing said number of bright pixels by a total number of pixels within the outline.

6. The method according to claim 5 wherein the predetermined threshold is 90% of the maximum luminosity.

7. The method according to claim 3 wherein the camera component is determined to be damaged if the percentage of bright pixels from the imaged shape that fit within the outline is less than 90%.

8. The method according to claim 1 wherein the known shape is a circle or an essentially round or elliptical area.

9. The method according to claim 1 wherein the light source is present in a field of view of the camera or the light source is in a vicinity of the field of view, when the image is taken.

10. The method according to claim 1 further comprising taking the image.

11. The method according to claim 1 wherein the one or more damage indicators comprise one or more artifact, pattern, contrast change, saturated region, blurred area, chromatic effect, light streak or other symptom.

12. The method according to claim 1 wherein the step of analyzing each area further comprises one or more of:
   calculating an optical parameter for each area and determining whether each optical parameter is indicative of at least one of the one or more damage indicators; and
   using a statistical analysis to determine whether at least one of the one or more damage indicators is present.

13. The method according to claim 12 wherein the optical parameter comprises one or more of: a colour; a wavelength; a luminosity; an intensity or a contrast.

14. The method according to claim 12 further comprising calculating an average optical parameter for each area and determining whether each average optical parameter is indicative of at least one of the one or more damage indicators.

15. The method according to claim 12 further comprising determining a percentage of a total number of pixels within each area, for which the optical parameter is within a predetermined range.

16. The method according to claim 15 wherein the predetermined range is 90% or more of an expected optical parameter.

17. The method according to claim 1 further comprising negating the light source in the image by:
   determining a brightest region corresponding to an area of greatest intensity in the image and all adjacent areas having an intensity in a pre-determined range of the greatest intensity; and
   excluding the brightest region from the step of analyzing each area.

18. The method according to claim 1 wherein the step of analyzing each area further comprises using a trained machine learning algorithm:
   to classify each area as comprising none of the one or more damage indicators or at least one of the one or more damage indicators; or
   to classify each area as resulting from a damaged or undamaged camera component.

19. The method according to claim 18 wherein the machine learning algorithm comprises one or more of: a neural network and a deep learning algorithm.

20. The method according to claim 19 comprising:
   extracting information from each area;
   comparing the extracted information against one or more predetermined probability vectors to establish whether the area should be classified as comprising none of the one or more damage indicators or at least one of the one or more damage indicators; and
   calculating a probability that the area is correctly classified.

21. The method according to claim 19 further comprising training the machine learning algorithm by providing multiple examples of images from damaged and undamaged camera components.

22. The method according to claim 21 wherein, during training, the machine learning algorithm performs the following processes:
   extracting information from the multiple examples;
   transforming the extracted information into information matrices;
   manipulating the information matrices into combined matrices; and
   using the combined matrices to establish a probability vector for each classification.

23. The method according to claim 1 wherein the image comprises a neutral background.

24. The method according to claim 1 comprising calculating a percentage of the areas determined as comprising at least one of the one or more damage indicators, compared to all areas of a single image, and classifying the camera component as damaged if the percentage is at least 1%, 2%, 5% or 10%.

25. The method according to claim 1 wherein images from damaged camera components are further classified as resulting from defective or destroyed components.

26. The method according to claim 25 wherein defective components are further classified as scratched, dented, dislocated, distorted or opaque.

27. The method according to claim 1 wherein the camera component is a camera lens, window or transparent front element.

28. A system for determining whether a camera component of a camera is damaged, the system comprising:
   a non-transitory computer-readable medium comprising programming instructions operable by a processor to carry out the following steps:
   obtaining information relating to one or more damage indicators;
   obtaining, from the camera, at least one image which has been taken when light from a light source has been incident on the camera component;
   dividing the image into one or more areas;
   analyzing each area to determine whether it comprises at least one of the one or more damage indicators;
   based on said analyzing, providing an indication of whether the camera component is classified as damaged or undamaged;
   wherein the non-transitory computer-readable medium is further operable by a diagnostic processor when in communication with the camera;
   wherein the system further comprises one or more of:
      the light source arranged to provide light incident on the camera component or;
      a fibre fiber optic cable arranged to direct light from the light source to the camera component; and
   wherein:
      the light source has a known shape;
      the light source is arranged outside of a field of view of the camera;
      the light source and/or camera is movable such that different images can be taken at different angles of illumination; or
      the light source is a white light source.

29. The system according to claim 28 comprising a controller configured to activate said light source when an image is taken.

30. The system according to claim 28 further comprising a neutral background such that the light source is at least 10 times more luminous than the background.

31. The system according to claim 28 further comprising a focal feature for the camera to focus on when taking the image.

32. The system according to claim 28 further comprising a holder and/or robotic arm configured to position the camera for taking the image.

33. The system according to claim 28, wherein the camera is provided on a mobile device.

34. The system according to claim 28, wherein the diagnostic processor further comprises a communication means for communication with the camera.

35. The system according to claim 28 wherein multiple light sources are arranged to provide light to the camera component and a controller is configured to turn each individual light source on and off such that one or more of the multiple light sources is active when an image is taken.

36. A computer-implemented method for determining whether a camera component of a camera is damaged comprising:
   performing the following steps:
      obtaining information relating to one or more damage indicators;
      obtaining, from the camera, at least one image which has been taken when light from a light source has been incident on the camera component;
      dividing the image into one or more areas;
      analyzing each area to determine whether it comprises at least one of the one or more damage indicators; and
      based on said analyzing, providing an indication of whether the camera component is classified as damaged or undamaged; or
   performing the following steps:
      obtaining, from the camera, at least one image of the light source with a known shape, the image comprising an imaged shape resulting from the light source;
      analyzing the image;
      determining whether the imaged shape is as expected for the case when the camera component is undamaged and/or for the case when the camera component is damaged; and
      providing an indication of whether the camera component is determined to be damaged or undamaged.

37. The method according to claim 36 wherein the step of analyzing each area comprises: one or more of:
- digitally comparing the imaged shape with the known shape; and
- using spatial mathematics to compare the imaged shape with the known shape.

38. A system for determining whether a camera component of a camera is damaged comprising:
- a non-transitory computer-readable medium comprising programming instructions, operable by a processor associated with the camera or a diagnostic processor when in communication with the camera, wherein the instructions when executed result in:
- performance of the following steps:
  - obtaining information relating to one or more damage indicators;
  - obtaining, from the camera, at least one image which has been taken when light from a light source has been incident on the camera component;
  - dividing the image into one or more areas;
  - analyzing each area to determine whether it comprises at least one of the one or more damage indicators; and
  - based on said analyzing, providing an indication of whether the camera component is classified as damaged or undamaged; or
- performance of the following steps:
  - obtaining, from the camera, at least one image of the light source with a known shape, the image comprising an imaged shape resulting from the light source;
  - analyzing the image;
  - determining whether the imaged shape is as expected for the case when the camera component is undamaged and/or for the case when the camera component is damaged; and
  - providing an indication of whether the camera component is determined to be damaged or undamaged.

39. The method according to claim 37 comprising generating an outline of the known shape on top of the imaged shape and calculating a percentage of bright pixels, from the imaged shape, that fit within the outline.

40. The method according to claim 39 wherein the step of generating an outline of the known shape on top of the imaged shape comprises:
- detecting a center of the brightest area in the image;
- drawing the outline of the known shape around the center;
- checking if the brightest area extends beyond the outline or checking if the brightest area does not extend to the outline; and
- adjusting the size of the outline such that the brightest area extends to the outline in at least one direction.

41. The method according to claim 39 wherein the step of calculating a percentage of bright pixels, from the imaged shape, that fit within the outline comprises determining a maximum luminosity of the imaged shape, determining the number of bright pixels within the outline having a luminosity within a predetermined threshold of the maximum luminosity, and dividing said number of bright pixels by a total number of pixels within the outline.

42. The method according to claim 41 wherein the predetermined threshold is 90% of the maximum luminosity.

43. The method according to claim 39 wherein the camera component is determined to be damaged if the percentage of bright pixels from the imaged shape that fit within the outline is less than 90%.

44. The system according to claim 38 comprising a controller configured to activate said light source when an image is taken.

45. The system according to claim 38 further comprising a neutral background such that the light source is at least 10 times more luminous than the background.

46. The system according to claim 38 further comprising a focal feature for the camera to focus on when taking the image.

47. The system according to claim 38 further comprising a holder and/or robotic arm configured to position the camera for taking the image.

48. The system according to claim 38, wherein the camera is provided on a mobile device.

* * * * *